United States Patent [19]

Wollar

[11] Patent Number: 4,936,530
[45] Date of Patent: Jun. 26, 1990

[54] RELEASABLE CLIP FOR RETAINING ELONGATED MEMBERS

[75] Inventor: Burnell Wollar, Barrington, Ill.

[73] Assignee: Phillips Plastics Corporation, Phillips, Wis.

[21] Appl. No.: 352,722

[22] Filed: May 15, 1989

Related U.S. Application Data

[63] Continuation of Ser. No. 202,467, Jun. 6, 1988, abandoned.

[51] Int. Cl.$^5$ .............................................. F16B 21/20
[52] U.S. Cl. ..................................... 248/71; 248/68.1; 248/74.2; 248/74.4
[58] Field of Search .................... 248/74.1, 74.2, 74.4, 248/74.5, 68.1, 71, 73; 24/16 PB

[56] References Cited

U.S. PATENT DOCUMENTS

| | | | |
|---|---|---|---|
| 2,447,291 | 8/1948 | Huette | 248/71 X |
| 3,430,903 | 3/1969 | Mathes | 248/71 X |
| 3,894,706 | 7/1975 | Mizusawa | 248/68.1 |
| 4,136,848 | 1/1979 | McCollum | 248/316.7 |
| 4,655,423 | 4/1987 | Schavilje et al. | 248/71 |
| 4,655,424 | 4/1987 | Oshida | 248/73 |
| 4,806,895 | 2/1989 | Petrow | 248/714 |

FOREIGN PATENT DOCUMENTS

| | | |
|---|---|---|
| 0659267 | 10/1937 | Fed. Rep. of Germany ..... 248/74.2 |
| 2909436 | 9/1980 | Fed. Rep. of Germany ........ 248/71 |
| 894867 | 4/1962 | United Kingdom ................ 248/74.2 |
| 1299592 | 4/1962 | United Kingdom ................... 248/71 |
| 1144348 | 3/1969 | United Kingdom ............... 248/74.2 |

Primary Examiner—Alvin C. Chin-Shue
Attorney, Agent, or Firm—Nilles & Nilles

[57] ABSTRACT

A releasable clip is provided for releasably holding an elongated member. The clip comprises a body and a slide member. The body includes a shank which is insertable into an aperture on a panel when the clip is installed and a head member having a first seat portion offset from the shank and a first latch means. The slide member is slidably mounted on the shank and has a second seat portion offset from the shank which is positionable in opposed facing alignment with the first seat portion. The slide member is movable along the shank to a seat closed position wherein the first and second seat portions are mated together around an elongated member. The slide member also has a second latch means interlockable with the first latch means to secure the first and second seat portions together in the seat closed position.

7 Claims, 3 Drawing Sheets

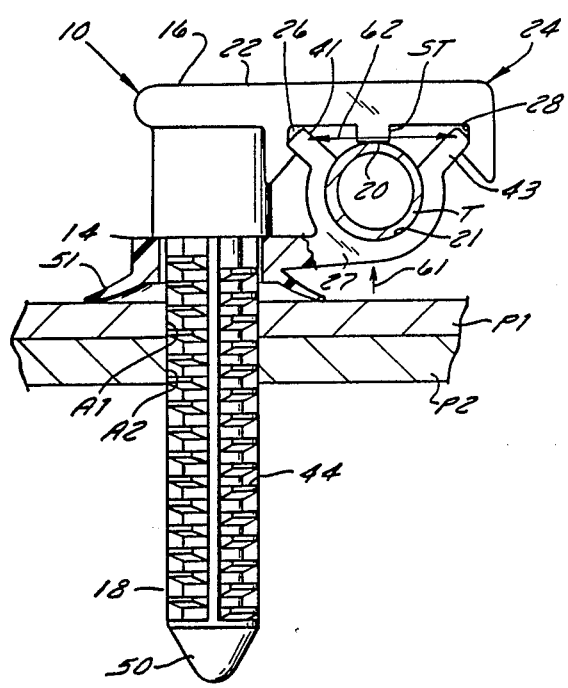
FIG. 7
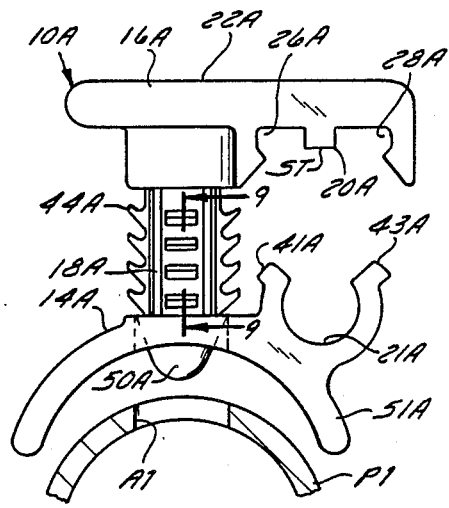
FIG. 8
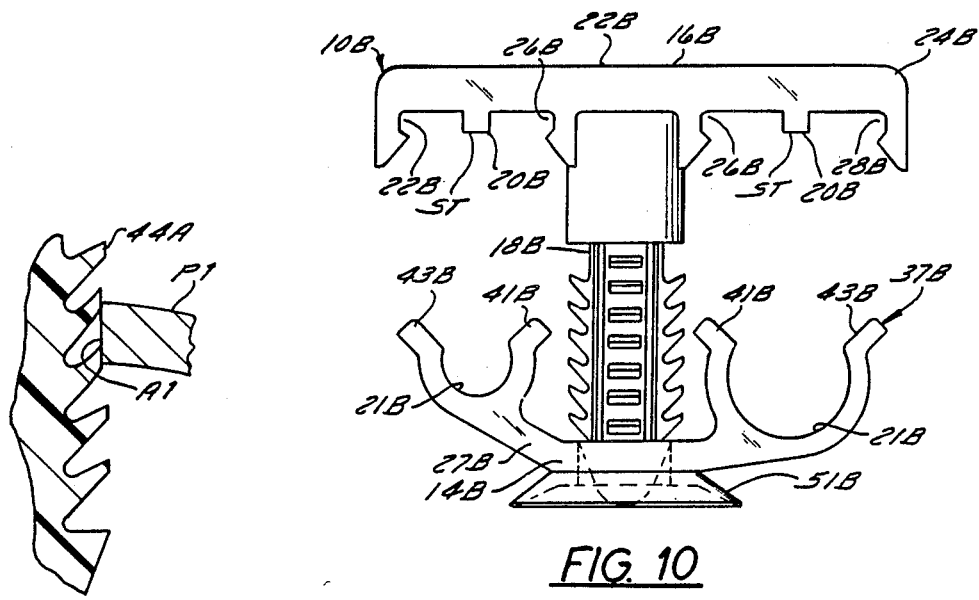
FIG. 9
FIG. 10

RELEASABLE CLIP FOR RETAINING ELONGATED MEMBERS

CROSS-REFERENCE TO A RELATED APPLICATION

This is a continuation application of the pending application Ser. No. 202,467, filed June 6, 1988, and which will be abandoned.

BACKGROUND OF THE INVENTION

1. Field of the Invention

This invention relates to a clip having seat portions which mate to releasably retain elongated members and more particularly to a clip which will constantly apply a bias in divergent directions to lock the elongated member therein minimizing free play and risk of accidental clip release.

2. Description of the Prior Art

Prior art retainer clips for securing elongated members such as fluid tubes, conduits, wiring harnesses, electric wires, control cables and the like to a panel take many forms. A first type of clip features a base from which a bayonet fastener projects for insertion in a panel aperture and spaced apart resilient arms which define a seat therebetween. An example of the resilient arm-type clip is disclosed in U.S. Pat. No. 4,195,807 issued April 1, 1980 to Joaquin R. Llauge and comprises a pair of resilient C-shaped arms which define a set in which the elongated member is retained. The resilient nature of the arms allows them to open to admit the member and this resiliency is also relied upon to cause the arms to grip and retain the member after it has been installed.

A second type of clip features a base member having a projecting bayonet fastener, a seat for the elongated member and an integral loop of flexible material, such as plastic, which is looped around the elongated member and releasably latched to the base. A typical clip of the loop type is shown in U.S. Pat. No. 4,564,163 issued Jan. 14, 1986 to Barry R.M. Barnett.

A third type of clip features a yoke of some kind having a bight portion dimensioned to hold the elongated member with the yoke then secured to the panel by a fastener.

These types of prior art clips will perform satisfactorily in some environments. However, many of these clips find application in the automotive industry where there is a virtually endless need to quickly and releasably affix many different types of elongated members in different locations such as under the hood, under the body or internally, such as in doors or in the dashboard. In the past, the primary goal of the automative manufacturer was to have a low cost clip which would permit quick installation. Thus, the bayonet of prior art clips discussed above can be quickly pushed into a receiving aperture in the panel or frame and the ability of the clip to tightly hold and retain the elongated member therein under all conditions did not receive as much attention.

However, purchasers have come to the point of demanding a quiet automobile and rattles and noises in automobiles have become a source of great concern for manufacturers. Not only must automobiles be manufactured to be initially rattle-free but they must remain totally rattle-free. Automobile manufacturers have investigated the source of rattles and it has been found that retaining clips for securing elongated members are one of the primary sources. The clips allow rattles to develop in several ways.

Most clips are made of plastic because it is low in cost, is easily moldable and remains corrosion-free. Unfortunately, an automobile in use presents a very hostile environment. The clips are subject to extremely high heat in the summer and at all times when next to the engine and exhaust systems. The clips are also subject to extreme cold in the winter. Further, the clips are subjected to extensive vibration whenever the car is driven, to severe shocks when rough roads and chuck holes are encountered, and to moisture and humidity when it rains.

The first resilient arm-type clip tends to become unreasonably flexible under high heat and humidity and its tension and rigidity declines. Further, the moisture and oil film, much of which comes from the road when it rains, lubricates the clip surfaces with the result that vibration and road shocks occurring as an automobile is run can cause the elongated member to dislodge from the clip and rattle. Reinforcing the clip arms with secondary arms or involved shapes does not prevent such dislodging under all conditions.

The second loop-type clip is also unsatisfactory because the flexibility of the loop per se, especially when hot, allows the elongated member to move relative to the panel on which it is mounted and repeatedly hits some other part of the automobile and causes noise. Further, if the elongated member does not fill the entire space within the loop, the member can rattle against the inside of the loop, especially when the loop is stiff due to cold, and creates unwanted noise.

The third yoke-type clip is also subject to becoming unduly flexible under high heat and consequently can allow the elongated member to come loose and rattle. Another disadvantage of the yoke-type clip is that it is impractical to preassemble the yoke to the elongated member. Thus, a subsupplier cannot preassemble and lock a plurality of yokes on the elongated member, such as a fuel line or wiring harness, and then ship the subassembly, to thus permit the automobile manufacturer to finally assemble by simply pushing the clips into pre-drilled apertures in appropriate locations in the automobile.

What is needed is a simple, low cost, reusable clip which can, if desired, be preassembled on an elongated member and locked thereon by a releasable latch and which will, when finally installed, provide constant positive bias in several diverging directions to virtually eliminate: (1) risk of accidental clip release, and (2) movement of the elongated member with or within the clip per se to eliminate rattles but which will allow quick release and reuse of the clip for service work.

SUMMARY OF THE INVENTION

In accordance with one aspect of the present invention, the releasable clip comprises a body and a slide member. The body includes a shank having a longitudinal axis for insertion into an aperture in a panel when the clip is in an installed position. The body also includes a head member which is mounted on the shank and has a first seat portion offset from the axis of the shank and a first latch means. The slide member of the clip includes a second seat portion also offset from the axis of the shank which is positionable in opposed facing alignment with the first seat portion. The slide member also includes an aperture for slidably receiving the shank therein to permit movement of the slide member and the associated seat toward and away from the head member between seat open and seat closed positions. The slide member further includes a second latch means which is interlockable with the first latch means to secure the first and second seat portions together when the slide member has been moved to the seat closed position to lock an elongated member in the clip when it is installed on a panel or the like.

In accordance with a further aspect of the invention, a first biasing means is provided on the clip to constantly bias the slide member in an axial direction parallel to the direction of the shank axis toward the head member to constantly urge the first and second seat portions together and the first latch means into engagement with the second latch means when the slide member is in the seat closed position. More specifically, the head and slide members both extend in a radially outward direction from the axis of the shank and a second biasing means is provided to constantly bias the first latch means into engagement with the second latch means in the radial direction when the slide member is in the seat closed position. The first and second latch means preferably includes latch receiving recesses on one of the members and spaced apart latch elements on the other of the members which are receivable in the recesses to lock the slide member in the seat closed position.

Preferably, the latch receiving recesses will be provided with first spaced apart internal locking surfaces and the latch elements will each have a second external locking surface that is engageable with one of the first locking surfaces when the slide member is in the seat closed position. It is also preferable that the second seat portion include spaced apart resilient arms that each have a freestanding end with the latch elements comprising a tab connected to each of the freestanding ends of the resilient arms to diverge away from each other towards spaced apart internal locking surfaces of a latch receiving recess. Preferably, the latch receiving recesses will comprise a set of first and second latch recesses mounted on a radially extending arm with the recesses being spaced apart in the radial direction to define an interstice therebetween. The first and second resilient latch elements are mounted on a second arm and spaced apart to extend obliquely away from each other with the first and second latch elements being movable into the interstice between the first and second latch recesses where the biasing means will cause the first and second latch elements to splay into the first and second recesses when the slide member is moved to the seat closed position to lock the elongated member in the clip when it is installed.

In another embodiment of the invention, a plurality of first seat portions and second seat portions are provided on the clip in order to secure a plurality of elongated members. More specifically, the head of the shank has a first arm that extends radially outward from the shank and a plurality of first seat portions are mounted on the arm. The slide member includes a second arm which extends radially outward from the shank and a plurality of second seat portions are mounted on the second arm. A plurality of sets of first and second latch recesses are provided on one of the arms and a plurality of sets of first and second latch elements are provided on the other of the arms to interlock each of the first and second seat portions together and lock the elongated member therein when the clip is in an installed position.

In a still further embodiment of the invention, the body includes a plurality of spaced apart parallel shanks each of which has a longitudinal axis. A head member is provided on each of the shanks and a plurality of first seat portions is provided on each of the head members. The slide member includes a plurality of shank receiving apertures thereto corresponding in number to the number of shanks. A plurality of second seat portions is provided on the slide member corresponding in number to the number of first seat portions provided on the head members with the second seat portions being in opposed facing alignment with the first seat portions. A plurality of first latch means are provided on each of the head members corresponding in number to the number of first seat portions and a plurality of second latch members are mounted on the slide member corresponding in number to the number of the first latch means. The first and second latch means are interlockable with each other to secure each of the first and second seat portions together when the slide member is in a seat closed position.

BRIEF DESCRIPTION OF THE DRAWINGS

Referring to the drawings:

FIG. 7 is a side elevational view partly in section showing the clip of FIG. 1 in an installed position on a panel and holding an elongated member therein;

FIG. 8 is a side elevational view of a second embodiment of the clip showing the slide member configured to fit the arcuate surface of a panel;

FIG. 9 is a partial sectional view taken along line 9—9 of FIG. 8;

FIG. 10 is a side elevational view of a third embodiment showing a releasable clip designed to hold a plurality of elongated members;

DESCRIPTION OF THE PREFERRED EMBODIMENTS

Figure 2:
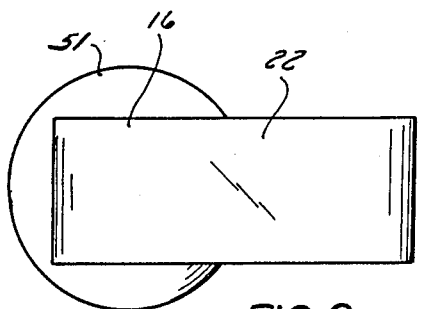
FIG. 2 is a top view of the releasable clip as shown in FIG. 1.
Figure 1:
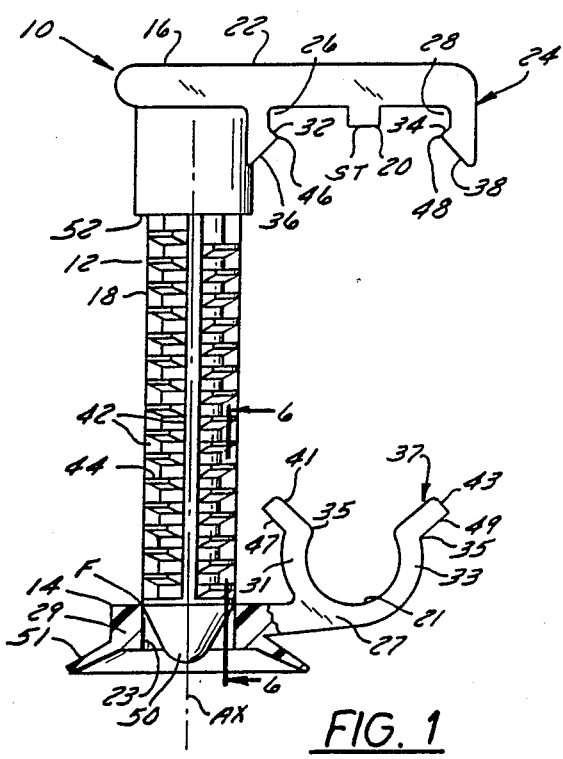
FIG. 1 is a side elevational view of the releasable clip showing the slide member thereof partly in section.

FIGS. 1 through 7 which show a first embodiment of the invention will now be described. With particular reference to FIG. 1, the releasable clip 10 comprises a body 12 and a slide member 14. The body 12 includes a head member 16 and a shank 18 having a longitudinal axis AX. The shank is dimensioned to be insertable into an aperture that is provided in a panel onto which the clip is to be installed. Preferably, the head 16 is molded integrally with the shank and has a first arm 22 which extends radially outward from the longitudinal axis AX of the shank in one direction.

The head member 16 is provided with a first seat portion 20 which is carried by the first arm 22 which preferably is integral with the head 16. The first seat portion 20 is radially offset from the axis AX of shank 18. The head member 16 also is provided with a first latch means 24 comprising latch receiving recesses 26, 28. The latch recess 26 has a first internal locking surface 32 and the latch recess 28 has a first internal locking surface 34. The recesses 26 and 28 are spaced apart in the radially extending direction of the first arm 22 and define an interstice therebetween. The head 16 also has a cam surface 36 adjacent recess 26 and a cam surface 38 adjacent recess 28.

The shank 18 which is part of the body 12 includes four longitudinally extending ribs 42 defining a circle C which represents the aperture into which the shank is to be inserted. The shank 18 also has a plurality of axially spaced apart flexible flaps 44 which extend laterally or radially outward beyond circle C and ribs 42. The shank 18 terminates in a cone-shaped tip 50.

Figure 4:
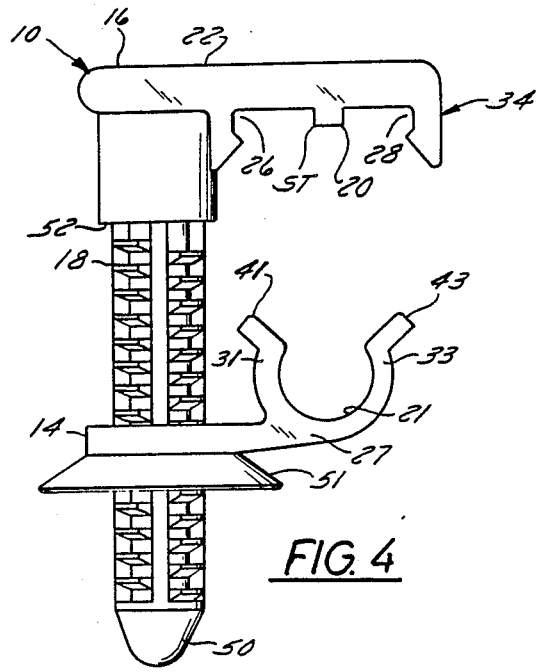
FIG. 4 is a side elevational view of the releasable clip shown in FIG. 1 showing the slide member predriven to a predetermined seat open position.
Figure 5:
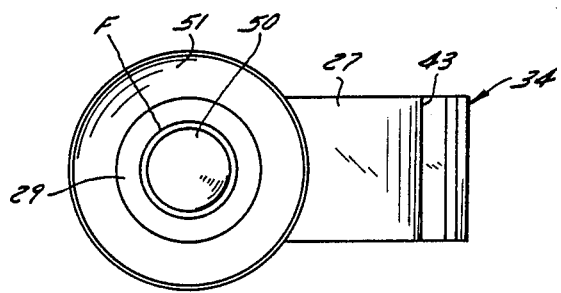
FIG. 5 is a bottom view of the releasable clip shown in FIG. 4.
Figure 3:
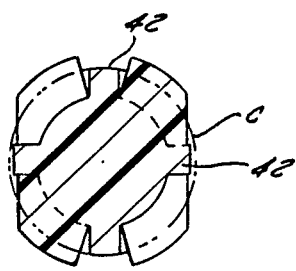
FIG. 3 is a sectional view taken along the line 3—3 of FIG. 1.
Figure 6:
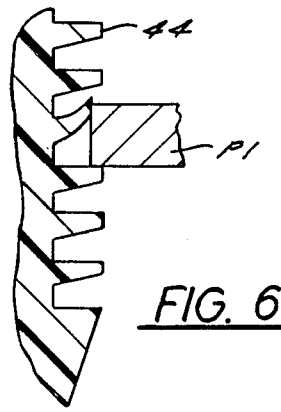
FIG. 6 is a partial sectional view taken along line 6—6 of FIG. 1 and showing the shank in relation to a panel.

The slide member 14 includes a second seat portion 21 offset from the axis of shank 18 and positionable in opposed spaced facing alignment with the first seat portion 20. The slide member 14 further includes an aperture 23 for slidably receiving the shank 18 to permit movement of the slide member and the second seat 21 toward and away from the head member 16 between a seat open position which is illustrated in FIG. 4 and a seat closed position which is illustrated in FIG. 7. Preferably, the second seat 21 is carried by a second arm 27 which extends in a radially outward direction from the axis AX of shank 18. Arm 27 is connected to a hub 29 which is part of the slide member 14.

The second seat portion includes opposed spaced apart resilient clamp arms 31 and 33 each having a freestanding end 35. The slide member 14 also includes a second latch means 37 which is interlockable with the first latch means 24 to secure the first and second seat portions 20 and 21 together when the slide member 14 is moved to the seat closed position shown in FIG. 7. The second latch means 37 includes a latch element 41 comprising a tab connected to the freestanding end 35 of clamp arm 31 and a latch element 43 comprising a tab secured to the freestanding end 35 of clamp arm 33. The latch elements 41 and 42 diverge away from each other and toward the spaced apart internal recesses 26, 28 of the first latch means 24. The latch element 41 has a second external locking surface 47 engageable with first internal locking surface 32 and latch element 43 also has a second external locking surface engageable with first internal locking surface 34 when the slide member 14 is in the seat closed position shown in FIG. 7. The first and second seat portions 20 and 21 are formed to mate with each other to define an integral seat having any desired internal contour required to match the external contour of an elongated member which is to be held therein when the clip is in an installed position. The slide member 14 also includes a resilient conical flange 51 is in compression between the slide member and the panel P1 as shown in FIG. 7 when the clip is in an installed position.

Preferably, the clip 10 comprising the body 12 and the slide member 14 is molded as one integral unit with a thin, fragile flashing F holding the slide member 14 unto the tip of the shank 18. In the alternative, the body 12 and the slide member 11 could be molded as separate pieces and assembled together. With a releasable clip of the design as above described the slide member 14 can be predriven along the shank 18 toward the head 16 a predetermined distance to expose a portion of the tip of the shank for convenient insertion into a shank receiving aperture in a panel and to place the second seat 21 at the most advantageous spacing from seat 21 to facilitate the insertion of the elongated member which is to be retained by the clip. Therefore, the manufacturer of the clip can ship the clips in their as-manufactured condition shown in FIG. 1 or in a predriven condition as illustrated in FIG. 4. If the clip is predriven, the flexible flaps 44 will hold the slide member 14 at any preselected spacing from the head 16.

To make a final installation, the elongated member such as tube T shown in FIG. 7 is placed in the clip with the tube T in the first seat 21. The shank 18 is then pushed into aperture A1 causing the slide member 14 with tube T therein to move upward toward the head member 16 until the latch elements 41 and 43 contact the cam surfaces 36, 38. The elements 41, 43 and clamp arms 31, 33 are resilient and allow the cam surfaces 36 and 38 to deflect toward each other. Continued movement of the slide member toward the head will cause the latch elements 41 and 43 to slide past ridges 46 and 48 and then expand into the recesses 26, 28. As the shank 18 is driven home into the aperture A1 in panel P1, the flaps 44 will assume the position shown in FIG. 6 to lock the shank 18 to panel P1 and the conical flange 51 being compressed will constantly urge the second seat 21 toward the first seat 20 in the direction of arrow 61 to lock the elongated member T therebetween.

If desired, the clip may be used in a subassembly which is subsequently finally installed. The subassembly may comprise either a plurality of clips preinstalled on the elongated member or a plurality of clips preinstalled on the elongated member and on a panel such as panel P1 in FIG. 7. To form the subassembly of the clips and an elongated member T, the slide member 14, with tube T therein, is moved along shank 18 toward head 16 until the above described interlocking of latch elements 41, 43 in recesses 26, 28 takes place. A plurality of clips 10 can be preassembled and securely locked on one or more elongated members T at any prescribed spacing needed to match apertures A1 provided in the panel P1 on which the subassembly will be finally installed. If required, the clips and elongated member can be installed on a panel P1 which is then shipped to the final assembler who install it on panel P2 which has apertures A2 spaced to match apertures A1.

In all final installations, the force applied in the direction of arrow 61 by flange 51 will splay the latch elements into the first and second recesses 26 and 28. The external tip to tip width of the latch elements 41 and 43 is slightly greater than the internal spacing between recesses 26 and 28 and thus when the latches 41 and 43 are forced upward into the recesses, the latches will be spring loaded in effect and then expand to exert a constant bidirectional bias in the direction illustrated by arrow 62 in FIG. 7. If desired, a stop member in the form of shoulder ST may also be provided to limit the degree to which the elongated member T can be urged against first seat 20. Thus the resilient conical element 51 constitutes a first biasing means to constantly bias the slide member 14 in the direction indicated by arrow 61 to urge the first and second seat portions 21 and 22 together. The resilient nature of the latch elements 41, 43 and/or the resilient nature of the clamp arms 31, 33 constitute a second biasing means to constantly bias the second latch elements 41, 43 into contact with the first latch means recesses 26, 28. In all installations, the elongated elements will be in compression and tightly held between the first and second seats 20, 21. In addition, some elongated members such as wiring harnesses, rubber or plastic tubes will resiliently deform when compressed and this resiliency will also constantly bias the second latch elements 41, 43 and clamp arms 31, 33 into the first latch recesses 26, 28. As the flaps 44 on shank 18 are flexible, it is possible to easily remove the shank from the panel aperture A1 or apertures A1-A2 by pulling upward on the head 16. Further, as the clamp arms 31 and 33 and latch elements 41, 43 are resilient it is possible to move the slide element 14 away from the head 16 to unmate the first and second seats 20 and 21 to release the elongated member T for service. None of the components of the releasable clip will be destroyed during such removal and it is possible to reuse the clip a number of times. The first and second seats 20 and 21 can be shaped and dimensioned to receive any type of elongated member for tight clamping therebetween when installed.

A second embodiment of the releasable clip identified by reference character 10A is shown in FIG. 8. Clip 10A is similar to the clip 10 shown in the embodiment of FIGS. 1 through 7 and includes first and second seats 20A, 21A which are identical in structure and function to the seats 20 and 21. In the embodiment of FIG. 8, the resilient conical base 51 is replaced by an arcuate base 51A configured to conform, for example, to an arcuate surface P1. In this embodiment, the radius of base 51A would be slightly smaller than the radius of the arcuate member P1 onto which it is mounted so that when the shank 18A is driven into the aperture A1, the base 51A will expand to provide the first biasing means for urging the slide member 14A toward the head member 16A with latch elements 41A, 43A urged into recesses 26A, 28A. In the embodiment of FIG. 8, the flap 44A of shank 18A is provided with a slightly more aggressive rake angle which will further increase the gripping power of the shank 18A when inserted into the aperture A1 as shown in FIG. 9.

FIG. 10 shows a third embodiment of the releasable clip identified by reference character 10B. In this embodiment, the head 16B has a first arm 22B which extends in two radial directions from the shank 18B and has a plurality of first seat portions 20B and a plurality of sets of first and second latch recesses 26B, 28B, one set for each of the first seat portions 20B. Similarly, the second arm 27B on hub 14B also extends in two radial directions from the hub 29B and has a plurality of second seat portions 21B corresponding in number to the first seat portions 20B with each of the second seat portions being positioned in opposed facing alignment with one of the first seat portions. The second arm 27B also has a plurality of sets of first and second latch elements 41B and 43B corresponding in number to the sets of latch recesses 26B, 28B. The releasable clip shown in FIG. 10 functions in exactly the same manner as previously described relative to the first embodiment shown in FIGS. 1 through 7. The shank 18B is driven home into an aperture in a panel and the first and second latch elements 41B, 43B deflect and lock into the first and second latch recesses 26B, 28B to lock the first and second seat portions 20B, 21B in mating relationship with an elongated member secured therein. The third embodiment of FIG. 10 also illustrates that the first and second seats may differ from each other in size or shape in order to accommodate different types of elongated members.

Figure 11:
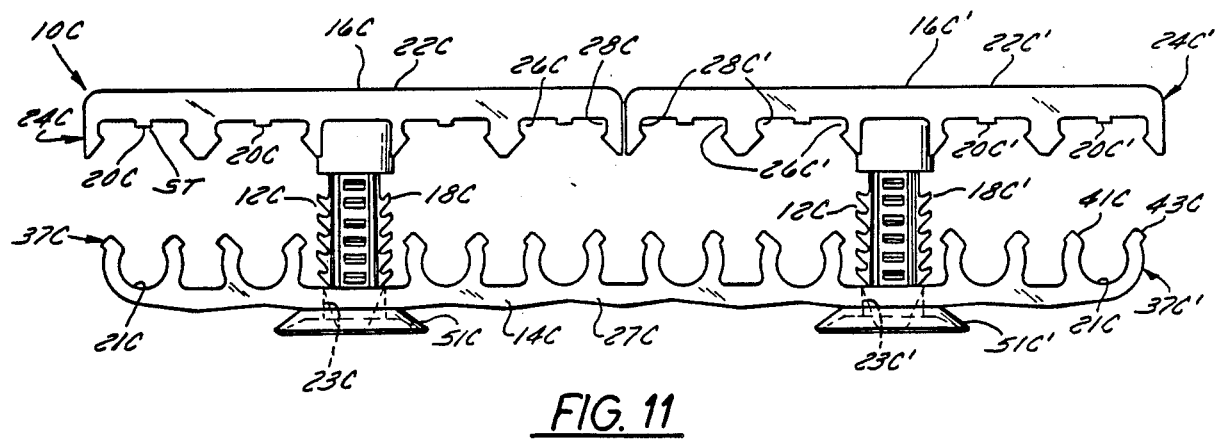
FIG. 11 is a side elevational view of a fourth embodiment showing a releasable clip for holding a plurality of elongated members.

FIG. 11 shows a fourth embodiment of the releasable clip which is similar to the third embodiment in that it includes a plurality of first and second seat portions. However, in the fourth embodiment, two spaced apart parallel extending shanks 18C and 18C' are provided. The single slide member 14C includes a first arm 27C which is provided with spaced apart apertures 23C, 23C' to permit the slide member 14C to be slidably mounted on the shanks 18C and 18C' and a conical compression element 51C, 51C' for each shank. The eight second seats 21C are formed integrally with the first arm 27C which extends in two radial directions from each of the shanks 18C, 18C'. The shank 18C has a head member 16C mounted thereon and similarly the shank 18C' includes a head member 16C' mounted thereon. The head member 16C includes a first arm 22C which extends in two radial directions from the shank 18C and has four first seat portions 20C formed thereon. Similarly, the second head portion 16C' has a first arm 22C' which extends in two radial directions from the shank 18C' and also has a total of four first seat portions 20C formed thereon. As shown in FIG. 11, this releasable clip would hold eight elongated members and it would be within the scope of the present invention to even increase the number of shanks if required and to increase the number of first and second seat portions as required by the particular installation.

The retaining clip shown in the fourth embodiment of FIG. 11 is assembled in the same manner as the retaining clip of the first embodiment shown in FIGS. 1 through 7 in that the slide member 14C is slid along shanks 18 and 18C' until each set of first and second latch elements 41C, 43C is locked into its respective first and second latch recesses 26C, 28C. Each of the shanks 18C and 18C' are rotatable within their respective apertures 23C and 23C'. Thus the shank 18C and head member 16C and arms 22C, for example, can be rotated slightly to provide a larger open space between arms 22C and 22C' to permit the elongated members to be inserted in the second seat portions 21C which are located on the slide member 14C between shank 18C and shank 18C'. The shank 18C is then rotated back to place all of the first seat portions 20C back in opposed facing relation to the second seat portions 21C to permit final assembly. With the releasable clip shown in FIG. 11, a total of eight elongated members can be assembled on the clip. If desired, the clip 10C could also be used to complete a subassembly which could subsequently be then installed in a quick and simple manner as previously described.

In the first, second, third and fourth embodiments, the slide member may be predriven at the time of manufacture of the clip to a position affording optimum spacing between the first and second seats 20, 21, 20A, 21A, 20B, 21B, or 20C, 21C to facilitate the most efficient insertion of the elongated member. Also in the first four embodiments, the first and second seat portions may be locked together leaving the free end of shank 18 exposed for preassembly on a panel, such as panel P1 shown in FIG. 7, with the panel and clips and the elongated member secured thereon shipped to the final manufacturer for completion. For example, the releasable clip disclosed in the first four embodiments could be used by a subcontractor who assembled conduits and wiring harnesses on a panel for final assembly in a car door. The releasable clips in this type of assembly would be secured to the elongated member at preindexed apertures in panel P1 so that the shanks would be accurately spaced for final assembly on a panel, such as panel P2 shown in FIG. 7, with the shanks lining up with a prespaced hole in the panel P2 to afford quick and easy assembly.

Figure 12:
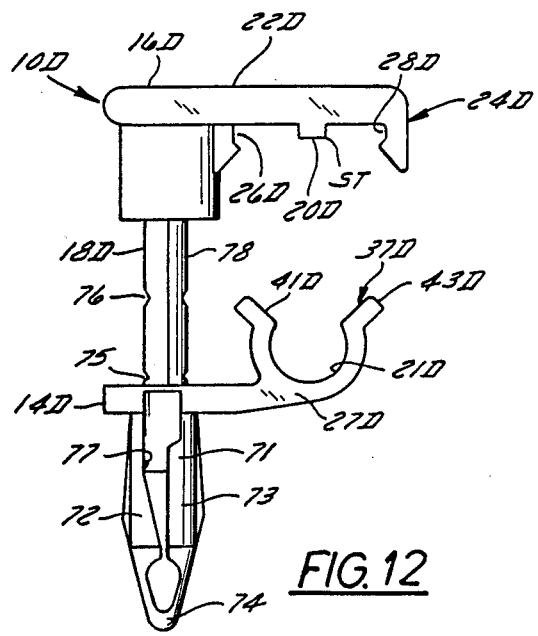
FIG. 12 is a fifth embodiment of the releasable clip embodying the invention.

FIG. 12 shows a fifth embodiment of the releasable clip which will function in substantially the same manner as the clips disclosed in embodiments 1 through 4. The embodiment of FIG. 12 differs in the type of bayonet fastening element utilized to secure the clip into a panel aperture. In the fifth embodiment, the slide member 14D is provided with an integral bifurcated member 71 comprising a pair of spaced apart legs 72, 73 connected at their free ends by an end portion 74. The shank 18D as initially molded projects into the slide member 14D by a few thousandths of an inch and is integrally connected with the slide member by a frangible flashing. The shank 18D includes notches such as notch 75 and 76. The legs 72 and 73 have opposing inner cam surfaces and during assembly the stem 78 of shank 18D is driven between the legs 72, 73 to flex them apart and lock them against the walls defining the aperture in a panel, not shown. The shank stem 78 may be provided with a notch 75 which cooperates with a detent lug 77 and leg 72 so that the shank may be predriven into the slide member until notch 75 engages detent lug 77. This amount of predriving will not expand legs 72 and 73. When the shank 18D is driven to the finally assembled position fully inserted between the legs 72 and 73, a second notch 76 will be engaged with detent lug 77 to resist outward withdrawal of the shank 18D. With the application of an upward force on the head 16D, the shank can be withdrawn back from its fully inserted locked position wherein the legs 72, 73 can relax toward each other so that the shank can be withdrawn from the panel into which it has been installed. If desired, a conical shaped compression member similar to member 51 shown in FIG. 1 could be provided between the arm 14B and the panel into which the releasable clip is inserted.

It is preferable in all embodiments that the first seat portion 20, 20A, 20B 20C, 20D be in the form of a projecting seat tab ST. The length of the tab ST can be fine-tuned so that the distance between the first seat and the second seat will accurately match the outer dimension of the tube or elongated member that is to be held therein.

It will be apparent from the foregoing description and the drawings that this invention provides a simple, low cost releasable clip which can be, if desired, molded as a single unit and which is capable of preassembly on an elongated member and locked thereon by a releasable latch which provides a constant bias in diverging directions to eliminate risk of accidental clip release and movement of the elongated member with the clip or within the clip to eliminate the rattles.

What is claimed is:

1. A panel and clip assembly of the type wherein said clip is insertable into an aperture of the panel for releasably mounting an elongated member on the panel comprising:
   a panel (P1) having outer and inner sides and an aperture therethrough;
   a clip (10) including a body (12) and a slide member (14), said body including;
      a shank (18) having a longitudinally extending axis dimensioned to be insertable in said aperture and having flexible retaining flaps (44) projecting therefrom for engagement with said panel inner side when said shank is inserted in said aperture from said outer side of said panel to hold said shank in position,
      a head member on said shank and having a first seat portion (20) offset from said shank and a first latch means (24) which includes laterally spaced apart latch receiving recesses (26, 28);
   said slide member (14) including;
      a hub means (23) slidably mounted on said shank for frictional engagement therewith and movable axially toward and away from said head member into seat open and seat closed positions,
      a second seat portion (21) canteleveredly mounted on said hub means in offset relation to said shank and positionable in opposed facing alignment with said first seat portion,
      spaced apart resilient arms (31, 33) mounted on said hub means to permit compression toward each other during axial movement of said hub into said seat closed position so that said arms will assert an inherent laterally outward directed force (62) in opposite directions away from any elongated member mounted therebetween,
      second latch means (37) mounted on said arms laterally movable outward into engagement with said spaced apart recesses of first latch means when in a seat closed position and retained in such engagement by said inherent laterally outward force generated by the inherent resiliency of said arms when said slide member is axially moved to said seat closed position; and
   a first axial biasing means (51) mounted between said slidable hub and said outer side of said panel and in compression when said clip is in an installed position, to serve a dual function of exerting a constant axial force (61) on said shank sufficient to hold said flaps against said inner side of said panel, and simultaneously urge said hub and second seat portion axially into contact with said first seat portion which contact causes said arms to splay laterally apart and provide an additional laterally outward force which supplements and increases said inherent laterally outward force generated by the resiliency of said arms urging said second latch means laterally into said spaced apart recesses and thereby increase the total amount of laterally outward force maintaining said arms in said recesses and increase the holding power of the clip to hold an elongated member therein when in its installed seat closed position on said panel.

2. A releasable clip according to claim 1 wherein said first axial biasing means comprises a resilient conical flange (51) having a concave side which is in compression between said slide member and said outside of said panel when clip is in an installed position.

3. A releasable clip according to claim 2 wherein:
   said slide member (14) comprises a hub (29) having an aperture (23) therethrough dimensioned to slidably receive said shank; and
   said resilient conical flange (51) and said hub are an integral unit with said flange surrounding said aperture so as to be between said hub and said outside of said panel when said clip is in said installed position.

4. A releasable clip (10) adapted to be inserted into an aperture (A1) of a panel from the outside thereof to retain an elongated member (T) comprising a body (12), and a slide member (14):
said body including,
a shank (18) having a longitudinal axis (AX) for insertion into said aperture, said shank having retaining means (44) for holding said shank in said aperture when said clip is in an installed position,
a head member (16) on said shank and having,
a first seat portion (20) offset from said axis, and
a first latch means (24) which includes laterally spaced apart latch receiving recess (26, 28); and
said slide member (14) including:
a second seat portion (21) defined by spaced apart resilient arms (31, 33), said second seat being offset from said axis and positionable in opposed facing alignment with said first seat portion,
a hub means (29, 33) canteleveredly mounting said second seat portion on said shank for axial movement toward and away from said head member into seat open and seat closed positions,
a second latch means (37) mounted on each of said arms and releasably interlockable in a laterally outward direction into said latch receiving recesses of said first latch means, the resiliency of said arms permitting compression thereof toward each other during said axial seat closing movement so that said arms will, in said seat closed position, assert an inherent laterally outward directed force (62) in opposite directions away from any elongated member mounted therebetween to maintain said latch means in said recesses; and
a first axial biasing means (51) thereon which is continually in compression between said slide member and said outside of said panel when said shank is secured in an installed position in said aperture to serve a dual function of exerting a constant axial force (61) sufficient to bias said slide member in an axial direction parallel to the direction of said shank axis toward said head member to hold said retaining means in said aperture when said clip is in an installed position and to constantly urge said second latch means into contact with said first latch means which contact translates said axial force into an additional laterally outward force that supplements and increases said inherent laterally outward force generated by the resiliency of said arms to increase the total amount of the laterally outward force available to maintain said second latch means in engagement with said latch recesses when said slide member is in said seat closed position.

5. A releasable clip according to claim 4 wherein said first axial biasing means comprises a resilient conical flange (51) having a concave side which is in compression between said slide member and said outside of said panel when clip is in an installed position.

6. A releasable clip according to claim 5 wherein:
said slide member (14) comprises a hub (29) having an aperture (23) therethrough dimensioned to slidably receive said shank; and
said resilient conical flange (51) and said hub are an integral unit with said flange surrounding said aperture so as to be between said hub and said outside of said panel when said clip is in said installed position.

7. In a releasable clip (10) adapted to be inserted into an aperture (A1) of a panel from the outside thereof to retain an elongated member (T) which includes body (12), and a slide member (14):
said body including:
a shank (18) having a longitudinal axis (AX) for insertion into said aperture, said shank having retaining means (44) to hold said shank in said aperture when said clip is in an installed position,
a head member (16) on said shank and having,
a first seat portion (20) offset from said axis, and
a first latch means (24) which includes laterally spaced apart latch receiving recesses (26, 28); and
said slide member (14) including;
a second seat portion (21) defined by spaced apart resilient arms (31, 33), said second seat being offset from said axis and positionable in spaced opposed facing alignment with said first seat portion,
a means (29, 23) for slidably mounting said slide member and second seat on said shank for axial movement toward and away from said head member into seat open and seat closed positions,
a second latch means (37) mounted on each of said arms and releasably interlockable into said recesses by movement of said arms in a laterally outward direction, the resiliency of said arms permitting compression of said arms laterally toward each other during said axial seat closing movement so that said arms will, when in said seat closed position, assert an inherent laterally outward directed force (62) in opposite directions away from any elongated member mounted therebetween to maintain said latch means in said recesses;
the improvement comprising;
a first axial biasing means (51) mounted between said slide member and said panel which will be continually in compression between said slide member and said outside of said panel when said shank is secured in an installed position in said aperture to serve a dual function of exerting a constant axial force sufficient to bias said slide member in an axial direction parallel to the direction of said shank axis toward said head member to hold said retaining means in said aperture when said clip is in an installed position and constantly urge said second latch means into contact with said first latch means which contact translates
said axial force into an additional laterally outward force that supplements and increases said inherent laterally outward force generated by the resiliency of said arms to increase the total amount of the laterally outward force available to hold said second latch means in engagement with said latch recesses when said slide member is in said seat closed position; and
a fragile flashing (F) fixedly securing said slide member and shank together to temporarily maintain said first and second seat portions in said spaced opposed facing alignment until said flashing is broken when said sliding movement of said slide member is required, said slidably mounting means comprising a hub means canteleveredly mounting said second seat portion.

* * * * *